July 21, 1964  R. J. NADHERNY  3,141,845
FILTER ELEMENT ASSEMBLY
Original Filed Nov. 14, 1955  2 Sheets–Sheet 1

INVENTOR.
RUSSELL J. NADHERNY
BY
Pollard Johnston Smyth & Robertson
ATTORNEYS

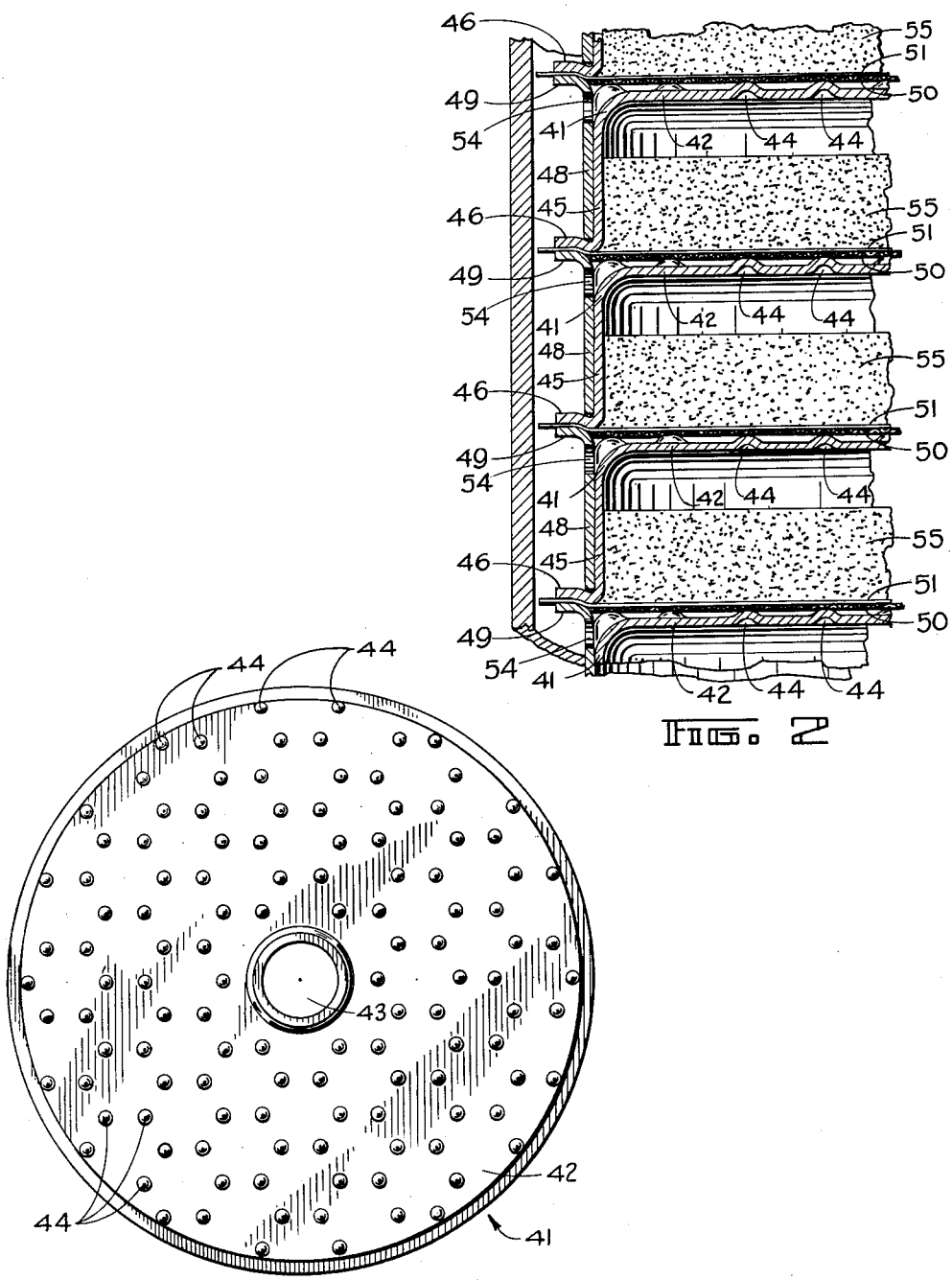

United States Patent Office 3,141,845
Patented July 21, 1964

3,141,845
FILTER ELEMENT ASSEMBLY
Russell J. Nadherny, Evanston, Ill., assignor to Ametek, Inc., New York, N.Y., a corporation of Delaware
Continuation of application Ser. No. 546,601, Nov. 14, 1955. This application Dec. 6, 1962, Ser. No. 243,216
3 Claims. (Cl. 210—237)

The present invention relates generally to filter devices, and more particularly is directed to improvements in filter devices of the kind having a series of superposed filter elements disposed within a sealed tank and through which the filtrate is passed, under pressure, with the filter elements separating solids from the filtrate and retaining such solids in the form of filter cakes.

This application is a continuation of application Serial No. 546,601, filed November 14, 1955, and now abandoned, in the name of Russell J. Nadherny.

In existing filter devices of the kind mentioned above, the filter elements include relatively complex, and hence costly, structures for supporting the filter layers, for example, filter cloths separated by spacer screens and on which the filter cakes are deposited.

Accordingly, it is an object of the present invention to provide a simple and inexpensive construction for filter devices of the kind mentioned above.

Another object is to provide a filter device of the described character wherein the filter elements are formed by the assembly of standardized components, so that any number of filter elements can be assembled together to permit the production of filter devices of different capacities from such standardized components.

A further object is to provide filter elements having the foregoing advantageous characteristics in a filter device of the kind mentioned above, and wherein the construction of the assembled filter elements permits the liquid to be filtered to be introduced, under pressure, into the individual filter elements adjacent the centers of the latter, with the filtrate being discharged, at the periphery of the assembly of filter elements, into the space between that assembly and the inner wall surface of the tank so that the latter is subjected to a reduced pressure and corresponding economies can be realized in the construction of the tank.

In accordance with one aspect of the invention, the assembly of filter elements includes a central inlet tube receiving the liquid to be filtered under pressure, a series of relatively shallow, inverted cup-shaped filter plates which are preferably formed of stamped or drawn sheet metal and have central apertures to receive the inlet tube and radially outward directed flanges extending along their lower peripheral edges, a series of rings having radially outward directed flanges extending along their upper edges, each ring fitting over a related one of the filter plates and with its flange supporting the flange of the filter plate thereabove, filter cloths or the like extending across the assembly between the successive filter plates and gripped at their peripheries between the flange of the overlying filter plate and the flange of the ring associated with the underlying filter plate, and separator screens underlying the several filter cloths to support the latter and resting upon dimples or the like formed in the top surface of the filter plates therebelow so that the liquid to be filtered enters each filter plate through suitably located radial openings in the inlet tube, and the filtrate passes through the cake deposited on the filter cloth extending across the bottom of the related filter plate and then flows radially outward between the separator screen and the dimpled top of the plate therebetween for discharge from the assembly through radial openings in the ring fitted over said plate therebelow. The assembly of filter elements is mounted within a tank or casing with an annular space being provided between the inner wall surface of the tank and the outer periphery of the filter element assembly so that the filtrate discharged from the latter enters the annular space and is withdrawn from the filter device through a suitable outlet connection on the tank.

Preferably, the several filter plates, rings, separator screens and filter cloths, and the inlet tube are clamped together to form an assembly that can be removed, as a unit, from the tank, thereby to facilitate cleaning of the filter cake from the filter cloths and replacement of any of the elements making up the assembly.

The above, and other object, features and advantages of the invention, will be apparent in the following detailed description of an illustrative embodiment thereof, particularly when the description is read in connection with the accompanying drawings, forming a part hereof, and wherein:

FIG. 2 is an enlarged, fragmentary sectional view showing the details of a portion of the structure represented in FIG. 1; and FIG. 3 is a top plan view of a filter plate included in the device of FIGS. 1 and 2.

Figure 1:
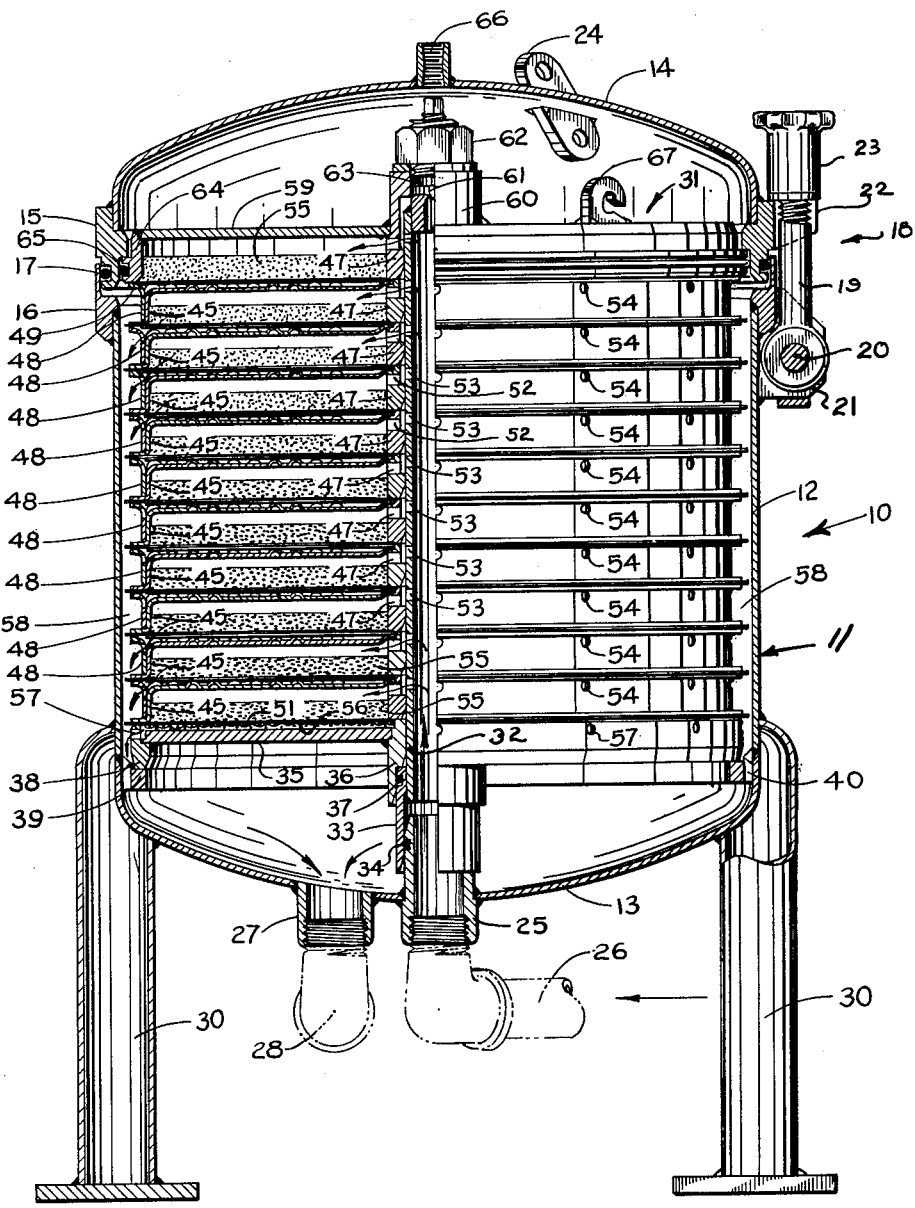
FIG. 1 is a vertical sectional view of a filter device embodying the present invention.

Referring to the drawings in detail, and initially to FIG. 1 thereof, a filter device, representing one form that the invention may take, is there illustrated and generally identified by the reference numeral 10.

The filter device 10 includes a tank or casing 11 having a vertical, cylindrical side wall 12, a dished bottom wall 13 welded to the lower edge of side wall 12, and a removable domed top closure 14 with a rim 15 along its lower edge fitting into a correspondingly shaped rim 16 on the upper edge of side wall 13. A sealing ring 17 is preferably interposed between the rims 15 and 16, and suitable clamping devices are provided for releasably holding the closure 14 on the remainder or lower portion of the tank 11. In FIG. 1, a single suitable clamping device is generally identified by the reference numeral 18 and there shown to include an eyebolt 19 pivoted on a pin 20 carried by a bracket 21 which is welded to the rim 16 and the adjacent portion of side wall 12. The free threaded end of bolt 19 is received in a related U-shaped lug 22 integral with the rim 15, and a hold-down nut 23 on the bolt 19 is engageable on the lug 22 to clamp the top closure in the position shown in FIG. 1. Although only one clamping device 18 appears in the sectional view of FIG. 1, it is to be understood that several of such devices are equally spaced apart around the periphery of the top closure. Further, the top closure 14 preferably has apertured lifting lugs 24 thereon (only one of such lugs appearing in FIG. 1) so that, following the release of the clamping devices 18, the top closure of the tank can be removed by a crane or the like attached to the lifting lugs. The cover may be flat or take various other forms as desired.

A relatively short tubular member 25 extends centrally through the bottom wall 13 and is internally threaded, at its lower end, for connection to a pipe 26, shown in broken lines, through which the liquid to be filtered is supplied to the device 10. The filtrate is withdrawn from the tank 11 through an outlet nipple 27 depending from the bottom wall 13 and adapted for connection to a pipe 28, shown in broken lines, for conducting the filtrate from the filter device to a storage tank or the like. The tank 11 is preferably supported on legs 30 so that the bottom wall 13 is elevated to provide clearance between the latter and the supporting surface for accommodating the inlet for liquid to be filtered and the outlet for filtrate.

An assembly of filter elements, generally identified by the reference numeral 31, is removably mounted within the tank 11 and receives the liquid to be filtered from the tubular inlet member 25 and, after the solids have been separated from the filtrate, discharges the latter back into the tank for removal from the latter through the outlet 27. In accordance with the present invention, the assembly 31 includes an elongated inlet tube 32 having an enlarged collar 33 welded on the lower end to telescope over the inlet member 25. Preferably, a sealing ring or packing 34 is interposed between the inlet member 25 and the collar 33 to prevent the passage of liquid directly into the tank 11 without being first treated by the assembly 31.

The assembly 31 also includes a bottom plate 35 having a central aperture in which a cylindrical collar 36 is welded, the collar 36 being slidable on the inlet tube 32 and having an enlarged diameter counterbore at its lower end to extend over the collar 33, with a sealing ring or packing 37 preferably being interposed between the collars 33 and 36. At its outer periphery, the bottom plate 35 has a downwardly directed, annular rim 38, the outer diameter of which is less than the inner diameter of the tank 11. The rim 38 is adapted to seat upon a ring 39 which is secured within the bottom portion of the tank 11 and spaced inwardly from the inner surface of the latter, for example, by radial lugs 40. The bottom plate can take various forms and may be of integral construction.

In accordance with the present invention, a series of superposed filter plates 41 of relatively shallow, inverted cup-shaped configuration are stacked upon the bottom plate 35. The filter plates 41 are preferably formed of stamped or drawn sheet metal and each includes a circular top wall 42 having a central aperture 43 and a pattern, which may be random, of upwardly extending, spaced apart dimples or projections 44 (FIGS. 2 and 3). A generally cylindrical rim 45 depends from the outer edge of top wall 42 and, at its lower edge, is turned radially outward to form an annular flange 46, as seen in detail in FIG. 2.

Spacing collars 47 (FIG. 1) extending around the inlet tube 32 are interposed between the central portions of the top walls 42 of successive filter plates 41 to hold such central portions in spaced apart relationship, while the upper end of each spacing collar preferably has an annular shoulder on which seats the edge of the related filter plate around the central aperture 43, so that the spacing collars 47 also serve to radially locate the filter plates concentrically with respect to the axis of the inlet tube 32.

At their outer edges, the filter plates 41 are spaced apart by ring members 48, also formed of stamped or drawn sheet metal, which slidably engage over the cylindrical rims 45 of the related filter plates 41. Each ring member 48 has a radially outward directed flange 49 (FIG. 2) at its upper edge, and the axial dimension of each ring member is such that, when the flange 46 of a filter plate rests upon the flange 49 of the ring member associated with the next lower filter plate, the lower edge of the upper filter plate is spaced upwardly from the plane of the top wall 42 of the lower filter plate by a distance approximately equal to the depth of the dimples or projections 44 rising from the top wall.

A separator screen 50 (FIG. 2) rests upon the raised dimples 44 of the top wall of each filter plate and supports a filter sheet 51, of either cloth or paper, which, at its outer periphery, is clamped between the flanges 46 and 49 and, at its inner edge around the inlet tube 32, is clamped between the upper surface of the top wall of the filter plate below the filter sheet being considered and the spacing collar 47 immediately above that underlying filter plate.

As seen in FIG. 1, each spacing collar 47 and the inlet tube 32 are provided with radially communicating openings 52 and 53, respectively, so that the liquid to be filtered can flow radially outward from the inlet tube 32 into the space defined under each of the filter plates 41. Further, as seen in detail in FIG. 2, each ring member 48 has openings 54 in the upper portion thereof communicating with the space defined between the dimples 44 rising from the top wall of the related filter plate and the screen 50 resting on such dimples, so that the filtrate, after passing downwardly through the filtering medium, for example, composed of filter cake 55 deposited on the cloth or paper filter sheet 51, flows radially outward over the top wall of the underlying filter plate and exits from the assembly 31 through the openings 54.

In order to permit the discharge of filtrate from below the filter sheet 51 extending across the bottom of the lowermost filter plate 41 in the assembly 31, that filter sheet is supported by coarse-mesh separator screens 56 (FIG. 1) resting upon the bottom plate 35 so that the filter sheet is spaced from the upper surface of the bottom plate and the filtrate can flow radially outward through the interstices in the screens 56 for discharge from the assembly at ports 57 formed in the peripheral rim 38 of the bottom plate.

As seen in FIGS. 1 and 2, the flanges 46 and 49, as well as the rim 38, have outer diameters that are substantially smaller than the inner diameter of the tank side wall 12, so that, with the assembly 31 in its operative position within the tank 11, an annular space 58 is defined around the filter element assembly into which the filtrate is discharged through the openings 54 and ports 57, and the filtrate drains from the space 58 through the clearance between the seat 39 and the wall surface of the tank into the bottom 13 from which the filtrate is withdrawn through the outlet 27.

The filter element assembly 31 is completed by a top plate 59 having a central hollow boss 60 that slidably engages on a threaded extension 61 welded to the upper end of the inlet tube 32, and a nut 62 on the extension 61 engages the hub 60 and urges the latter and the top plate 59 to seat against the uppermost spacing collar 47. Preferably, a sealing ring or packing 63 is interposed between the confronting surfaces of the hub 60 and extension 61. At its outer peripheral edge, the top plate 59 has a depending rim 64 welded, or otherwise secured thereto, and adapted to seat upon the flange 49 of the uppermost ring member 48 with a filter sheet being gripped, at its periphery, between rim 64 and the related flange 49 and being supported on a screen 50 which rests upon the dimpled top wall of the uppermost filter plate 41. Thus, liquid to be filtered is also admitted to the space under top plate 59 through the openings 52 of the uppermost spacing collar 47 and through the registering openings 53 of the inlet tube, while the filtrate from the top plate passes radially outward, through the openings 54 of the uppermost ring member 48, into the annular space 58. Preferably, a sealing ring or packing 65 is interposed between the rims 15 and 64, and the latter are provided with engageable, radially extending shoulders so that, when the closure 14 is clamped upon the rim 16 by the clamping devices 18, the closure 14 bears downwardly on the top plate 59, at the periphery of the latter to ensure the desired compaction of the peripheral portions of the filter plates 41 and of the ring members 48 between the top plate 59 and the bottom plate 35. Since the closure 14 is sealed with respect to the top plate 59 by the sealing ring 65, the closure is preferably provided with a vent connection 66 so that air trapped between the top closure and the top plate will not resist the final downward movement of the closure. The top plate 59 may be provided with hooks 67 or the like, by which the filter element assembly 31 can be hoisted, as a unit, into or out of the open tank 11.

Since the liquid to be filtered enters the filter plates 41 at the centers of the latter under a relatively high pressure, and the filtrate discharge through the openings 54 and ports 57 into the space 58 bounded by the tank wall is under a substantially reduced pressure, by reason of the resistance to flow of the filtrate imposed by the filtering medium, it is apparent that the internal pressures exerted upon the tank 11, in a filter device embodying this invention, can be relatively low. Thus, the tank can be of relatively light weight construction with resultant savings in its cost, as compared with those existing filtering devices wherein the liquid to be filtered, which is under a high pressure, either enters the filter elements at the outer periphery thereof or at locations adjacent both the outer peripheries and the centers of the filter elements so that the tank wall is then subjected to the high pressure of the liquid to be filtered.

Further, the present invention makes possible the above described mode of operation in a filter device wherein the filtering medium is supported by structures that are, for the most part, formed of drawn or stamped sheet metal, specifically, the sheet metal filter plates 41 and ring members 48, and these standardized, and relatively inexpensive, components can be assembled together in larger or smaller members to provide filter devices having different desired productive capacities.

It is also to be noted that, upon removal of the filter element assembly 31 from the tank 11, the assembly 31 can be easily taken apart, merely by removal of nut 62 from the extension of the inlet tube, to permit thorough cleaning of the cake 55 from the filter sheets 51 or replacement or repair of any parts of the assembly requiring the same.

Although a particular embodiment of the invention has been described in detail herein with reference to the accompanying drawings, it is to be understood that the invention is not limited to that precise embodiment, and that various changes and modifications may be effected therein without departing from the scope or spirit of the invention, except as defined in the appended claims.

What is claimed is:

1. In an assembly of filter elements for a pressure filter device, the combination of a series of cup-shaped sheet metal filter plates superposed in inverted positions and including a substantially horizontal wall surrounded by a substantially vertical wall with a substantially horizontal flange means surrounding said vertical wall, said plates being arranged so that a filter space confined within each filter plate opens downwardly toward the top horizontal wall of the next lower filter plate; a ring member extending around each of said filter plates, in contact with the vertical wall thereof and having an upper edge flanged means at an elevation slightly greater than the top of the horizontal wall of said filter plates for supporting the next higher filter plate; a sheet of filtering material extending across the bottom of each filter space and secured, at its periphery, between the flanged means of the related filter plate and the flanged edge means of the ring member supporting the latter; a separator screen means below each sheet of filtering material and resting on the top surface of the next lower filter plate to hold the related sheet of filtering material spaced from said top surface of the next lower filter plate; and means for introducing above each sheet of filtering material a liquid to be filtered under pressure into the central portion of the filter space confined within each of the filter plates, the solids filtered from said liquid being deposited on said filtering material and progressively forming a filter cake thereon, said means for introducing a liquid being adjacent the lower surface of the next higher filter plate to introduce said liquid above said solids and said filter cake, said ring members having apertures therein opening inwardly below the related sheet of filtering material and above the top surface of the next lower filter plate so that the filtrate passing through said sheet of filtering material exits from the assembly through said apertures.

2. A pressure filter device comprising a vertical tank having a removable top closure, an inlet for liquid to be filtered located at the center of the bottom of the tank and an outlet for filtrate in the bottom of the tank spaced laterally outwardly from said inlet; and an assembly of filter elements fitting into said tank through the top of the latter and spaced laterally from the inner wall surface of the latter to define an annular space communicating with said outlet, said assembly including an inlet tube engageable, at its lower end, with said inlet of the tank, a series of cup-shaped sheet metal filter plates including a substantially horizontal wall surrounded by a substantially vertical wall with a substantially horizontal flange means surrounding said vertical wall, each plate having a central aperture, said filter plates being superposed in inverted positions with said inlet tube extending through said central apertures, a ring member extending around each of said filter plates, in contact with its vertical wall and having a flanged upper edge slightly higher than the vertical wall of its corresponding plate for supporting the lower peripheral horizontal flanged edge of the next higher filter plate, filter means extending across the bottom of each filter plate to define a filter space thereabove within the related filter plate, separator means holding each of said filter means spaced from major portions of the top surface of the next lower filter plate, and means adjacent the opposite ends of said inlet tube and extending to said ring members adjacent thereto for axially compacting said filter plates, ring members, filter means and separator means, said inlet tube having radial openings communicating with said filter spaces above the related filter means to admit liquid to be filtered into said filter spaces, the solids filtered from said liquid being deposited on said filtering material and progressively forming a filter cake thereon, said radial openings being adjacent the lower surface of the next higher filter plate to admit said liquid above said solids and said filter cake, said ring members having openings therein communicating with the spaces below the related filter means and above said major portions of the top surfaces of the next lower filter plates and through which the filtrate passing through said filter means is withdrawn from said assembly into said annular space communicating with said outlet.

3. A filter element for a pressure filter device, comprising a formed sheet metal member of inverted cup-shaped configuration including a dimpled substantially horizontal top surface surrounded by a substantially vertical wall with a substantially horizontal flanged edge surrounding the vertical wall, said top surface having a central aperture for receiving an inlet tube carrying the liquid to be filtered, a ring member slippable over and in contact with the vertical wall of said cup-shaped member and having a flanged upper edge radially coextensive with said flanged edge of said cup-shaped member, said ring member having openings therein below said upper edge and above its engagement with said cup-shaped member, a collar member having an upper portion adjacent the lower surface of said cup-shaped member at said central aperture, said collar member being adapted to receive said inlet tube, the upper portion of said collar member having openings, a sheet of filtering material extending across the open bottom of said cup-shaped member and, at its periphery, underlying said flanged lower peripheral edge, and separator screen means below said sheet so that, when a plurality of such filter elements are superposed, each cup-shaped member has its peripheral flanged edge supported on the flanged edge of the ring member associated with the next lower cup-shaped member with the periphery of each sheet of filtering material secured between the engaging flanged edges of the cup-shaped and ring members and with said separator screen means being supported on the dimpled top surface of the next lower cup-shaped member to provide passages between said screen means and said dimpled top surface, each cup-shaped member having the portion of its lower surface adjacent said central aperture supported on the upper portion of the collar member beneath it with each sheet of the filtering material being adjacent the lower portion of the next higher collar member, the solids filtered from said liquid being deposited on said filtering material and progressively forming a filter cake thereon, and the openings in said collar means being adjacent the lower surface of the next higher filter plate to introduce said liquid above said solids and said filter cake.

References Cited in the file of this patent
UNITED STATES PATENTS

| | | |
|---|---|---|
| 311,257 | Piefke | Jan. 17, 1885 |
| 2,452,486 | O'Meara | Oct. 26, 1948 |
| 2,624,465 | Kracklauer | Jan. 6, 1953 |